Sept. 24, 1963
W. G. BLENMAN
3,104,675
AUTOMATIC PRESSURE LIMITING VALVE
Filed April 18, 1961
2 Sheets-Sheet 1
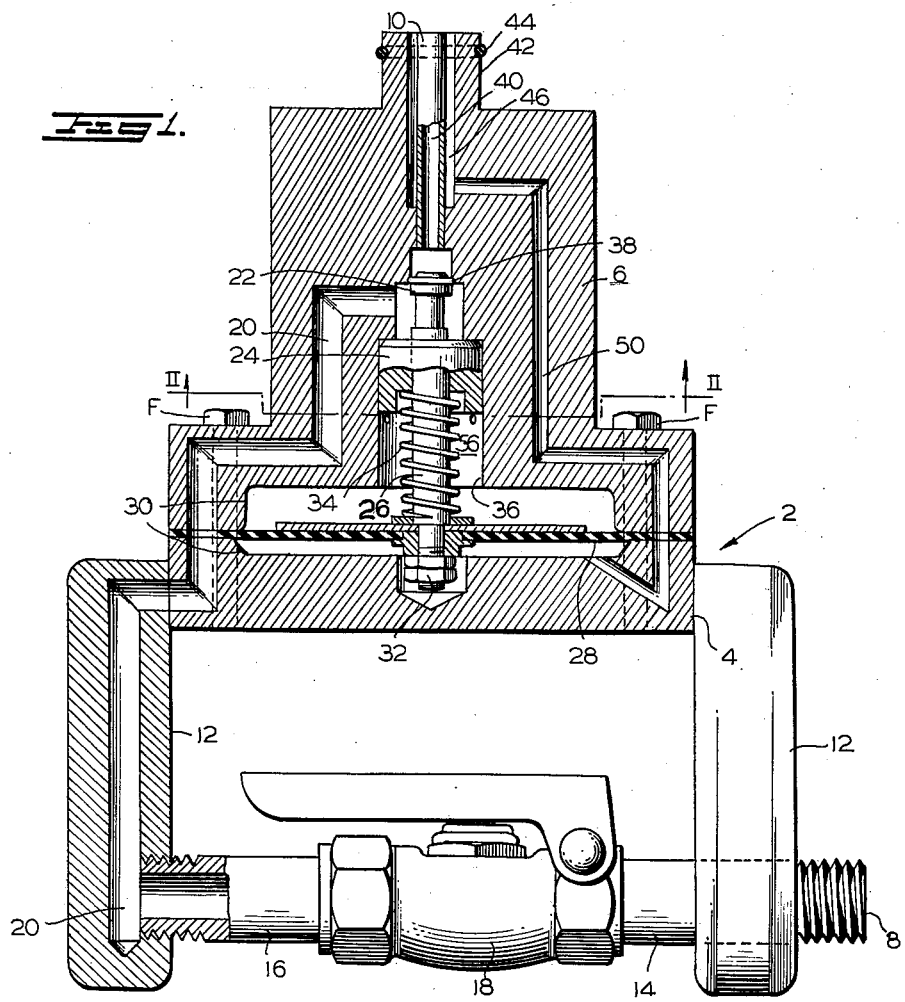
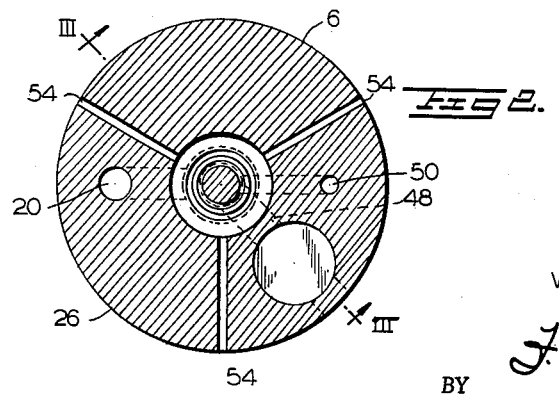
INVENTOR
WILLIAM G. BLENMAN
BY F. J. Soucek
ATTORNEY Sept. 24, 1963  W. G. BLENMAN  3,104,675
AUTOMATIC PRESSURE LIMITING VALVE
Filed April 18, 1961  2 Sheets-Sheet 2
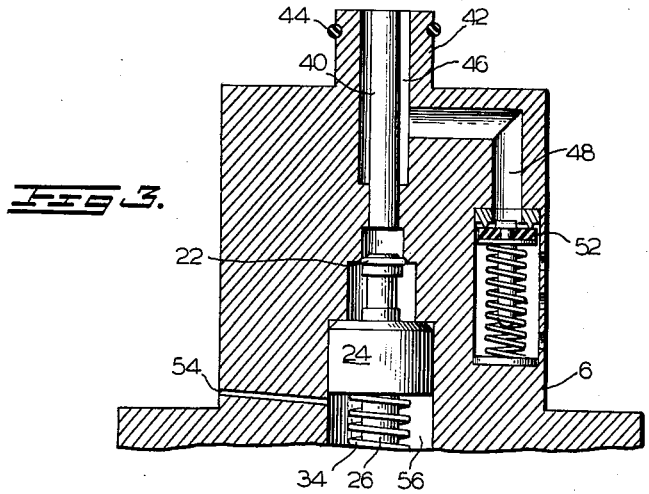
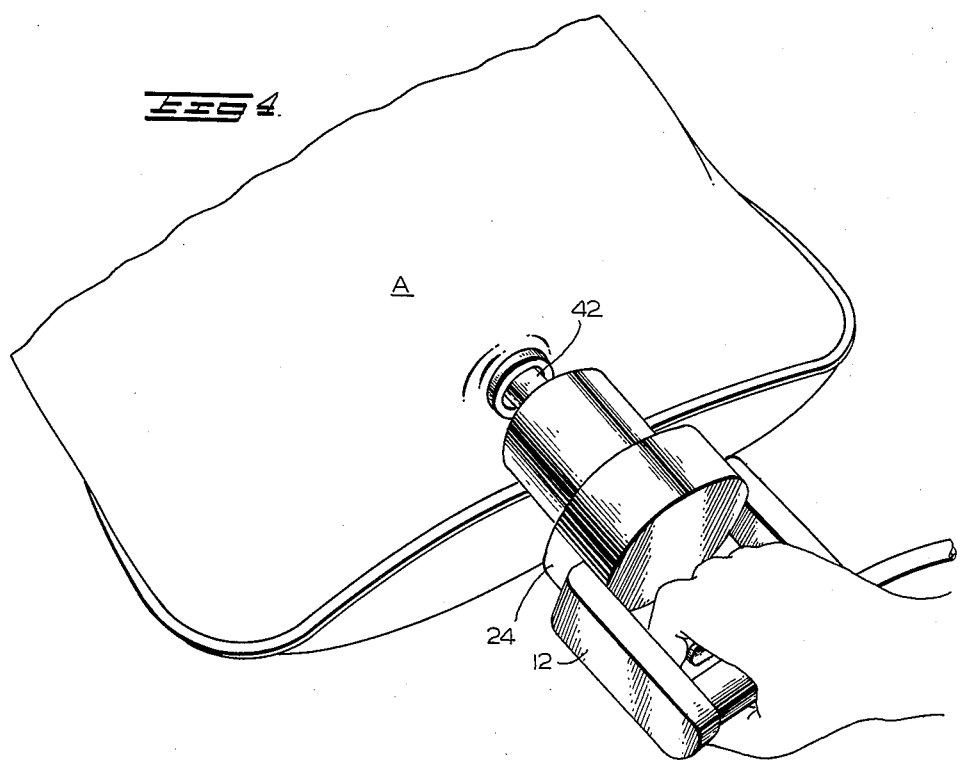
INVENTOR
WILLIAM G. BLENMAN
BY *F. J. Loucek*
ATTORNEY

United States Patent Office 3,104,675
Patented Sept. 24, 1963

3,104,675
AUTOMATIC PRESSURE LIMITING VALVE
William G. Blenman, Detroit, Mich., assignor to General Motors Corporation, Detroit, Mich., a corporation of Delaware
Filed Apr. 18, 1961, Ser. No. 103,876
3 Claims. (Cl. 137—225)

This invention relates to pressure limiting valves and more particularly to an automatic pressure limiting valve which terminates a flow of pressure fluid upon the attainment of a predetermined pressure within an object subjected to the pressure.

In recent years, the use of inflated objects for various purposes has become common. Inflation of these objects such as cushioning bags, buoyant containers, and shock absorbing devices has presented the need for a portable inflation control device. More specifically, a device which is automatically controlled as well as incorporating the previous mentioned portable attribute is desired.

Therefore, among the objects of this invention is the provision of an automatic pressure limiting valve which is readily portable so as to be easily connected to an object to be inflated.

A further object of this invention is the provision of an automatic pressure limiting valve which automatically senses the pressure within the object under inflation and limits the amount of pressure applied therein.

Another object of this invention is the provision of a pressure limiting valve assembly wherein the magnitude of the maximum pressure applied to an object being inflated can be readily altered.

Still another object of this invention is to provide a pressure limiting valve assembly which incorporates a safety mechanism which will insure pressure limitation should the prime pressure regulating mechanism fail to function properly.

The exact nature of this invention, as well as other objects and advantages thereof, will be readily apparent from consideration of the following specification relating to the annexed drawings in which:

FIGURE 1 is a plan view, partly in section, of a preferred embodiment of the invention.

FIGURE 2 is a sectional view taken on line II—II of FIGURE 1.

FIGURE 3 is a sectional view taken on line III—III of FIGURE 2.

FIGURE 4 is a perspective view of a pressure limiting valve assembly connected to a dunnage bag to be inflated.

Referring to the drawings, particularly FIGURE 1, a valve body 2 is shown to comprise a handle portion 4 and a regulating portion 6. The handle portion 4 contains an inlet port 8 while the regulating portion 6 of the valve body contains a discharge or outlet port 10. The handle portion also has longitudinally extending supports 12 which have a first pipe 14 and a second pipe 16 secured therein. A control valve 18 is fitted to the pipes 14 and 16 and connects with fluid passages 20 formed within the handle and regulating valve body portions. A poppet valve 22 having a guide member 24 and a stem 26 is positioned or disposed within valve body regulating portion 6.

A resilient diaphragm 28 is disposed within a cavity 30 formed between the connection of the valve body handle portion 4 and the regulating portion 6. The diaphragm is secured to the valve stem 26 by any suitable means as shown at 32. A poppet valve biasing spring 34 is concentrically disposed about valve stem 26 and engages valve guide 24 and the diaphragm 28. The valve body portions 4 and 6 are fastened together and secure the diaphragm 28 by any suitable means, such as bolts F shown in FIGURE 1. The valve body regulating portion 6 comprises a cylinder 36 to receive the poppet valve guide member 24 and valve 22 is adapted to engage a valve seat 38 formed within body portion 6.

A discharge passage 40 is formed within a connecting means 42 which is provided to engage and be fastened to an object being inflated. Connecting means 42 can be provided with any suitable sealing means 44 to insure a tight fluid connection between valve body 2 and the object being inflated. A fluid feedback or re-entry passage 46 is disposed or formed concentrically about fluid discharge passage 40 and connects with a safety valve passage 48, as shown in FIGURE 3, and a branch passage 50. A conventional safety valve 52 connects with passage 48 as shown also in FIGURE 3. Breather passages 54 are incorporated to provide an atmospheric connection between chamber 56, above the diaphragm 28, and the exterior of the casing portion 6.

In operation of the disclosed invention, connecting means 42 is connected to an object, generally shown in FIGURE 4 and referenced A, to be inflated or pressurized and manually operated control valve 18 is then actuated to induce fluid under pressure from an external source. The pressurized fluid is transmitted through fluid passages 20 beyond poppet valve 22, which is biased to a normally open position by spring 34. Downstream of valve 22 the pressure fluid flows in discharge passage 40 through the connecting means 42 into the object A, shown in FIGURE 4. As the pressure increases within dunnage bag or cushioning device A, a return flow of fluid is created within re-entry or fluid feedback passages 46. This re-entrant fluid is directed to the upstream side of diaphragm 28 and the pressure responsive surface of conventional safety valve 52. As the pressure within the bag A increases, the force upon diaphragm 28 eventually overcomes the force of poppet valve biasing spring 34 and valve 22 engages seat 38, thereby preventing further induction of pressure fluid within the bag, reservoir, or tank A.

Should poppet valve 22, for some reason, fail to seat upon attainment of a desired pressure within bag A, a relatively small further increase of pressure in passage 48 will unseat safety valve 52 allowing fluid to exhaust to atmosphere, thereby relieving the pressure and preventing rupturing or damage to object A.

Small breather passages 54 connect the chamber 56 above or downstream of diaphragm 28 with atmosphere thereby eliminating any possible existence of a pressure lock which would ordinarily hinder movement of the diaphragm against valve biasing spring 34.

It is readily obvious to anyone skilled in this art that the valve body regulating portion 6 can be removed from handle portion 4 and a poppet valve biasing spring 34 of any predetermined strength can be readily inserted to vary the shut-off pressure of this assembly. This invention then results in a highly desirable portable valve assembly which automatically limits an applied pressure in response to a pressure build-up within a device being pressurized and further incorporates means for readily varying the limiting pressure.

It should be understood, of course, that the foregoing disclosure relates to only a preferred embodiment of the invention and that it is intended to cover all changes and modifications of the example of the invention herein chosen for the purposes of the disclosure, which do not constitute departures from the spirit and scope of the invention.

What is claimed is:

1. A portable pressure limiting valve assembly comprising a valve housing, fluid inlet and outlet ports in said housing, means containing said outlet port for connecting said valve housing to an object to be inflated, a fluid re-entry conduit located within said connecting means, a fluid discharge conduit disposed within said re-entry conduit and terminating at said outlet port, said fluid re-entry conduit affording transmittal of fluid supplied to said object being pressurized to within said valve housing member, a poppet valve disposed in said valve housing member to regulate fluid discharge flow through said outlet port, a manually operable valve controlling flow of fluid to said poppet valve, a spring biasing said poppet valve to a normally open position, said poppet valve being slidably supported within said valve housing member, resilient means provided to support said poppet valve, said resilient means responsive to said fluid pressure re-entering said valve housing from said object being inflated to close said poppet valve when said object is supplied with a predetermined pressure, and a safety valve disposed within said valve housing, said safety valve being responsive to said pressure supplied to said object being inflated so as to relieve excessive pressures within said object upon failure of said poppet valve to close at a preselected pressure.

2. A portable automatic pressure limiting device comprising a casing member, said casing member comprising a handle portion and a fluid discharge portion, a manually operable control valve supported by said handle portion, a fluid inlet port in said handle portion, a discharge port in said fluid regulating portion, fluid passages within said casing connecting said fluid inlet and discharge ports, a poppet valve operable to restrict fluid flow in said fluid passages, said poppet valve comprising a cylindrical guide portion, a cylinder within said casing to slidably receive said poppet valve cylindrical guide portion, a spring biasing said poppet valve to an open position, means for connecting said casing to an object to be pressurized by fluid discharged from said casing, said means comprising a seal to prevent fluid leakage between said casing and said object being pressurized, said means further comprising a discharge port, a fluid feedback passage concentrically disposed about said discharge port in said connecting means, a diaphragm resiliently supporting said poppet valve, said diaphragm being secured within a cavity formed between said casing handle portion and said casing fluid regulating portion, fluid passages within said casing regulating portion which receive and transmit said feedback fluid to said diaphragm to position said poppet valve in accordance with a pressure present in said object being pressurized, a safety valve in said casing member, and a second passage within said regulating portion of said casing to receive and transmit said feedback fluid to said safety valve, said safety valve sensing said feedback fluid pressure and relieving excessive pressures that may occur within said object being inflated.

3. A portable automatic pressure limiting device comprising a casing member, said casing member comprising a handle portion and a fluid regulating portion, a control valve fastened to said handle portion, a fluid inlet port in said handle portion, a fluid discharge port in said regulating portion, fluid passages connecting said inlet and said outlet ports, means being provided to connect said discharge port to an object to be inflated, fluid feedback passages located concentrically about said discharge port to allow re-entry of fluid from said object being inflated to within said valve casing, a poppet valve disposed in said casing fluid passages to regulate the discharge of fluid flow from said casing to said object being inflated, said poppet valve comprising a resilient valve portion, said poppet valve further having a stem member, a piston guide member secured to said valve stem member, a diaphragm fastened between said casing handle portion and said casing regulating portion, a first cylinder formed within said casing regulating portion to slidably receive said poppet valve piston, a spring disposed between said poppet valve piston and said diaphragm to bias said poppet valve to a normally open position thereby allowing fluid discharge to said object being inflated, a first of said fluid feedback passages connecting with the side of said diaphragm remote from said biasing spring to close said poppet valve upon the existence of a predetermined pressure within said object under inflation, a safety valve, a second cylinder formed within said casing, said safety valve being located within said second cylinder, a spring biasing said safety valve closed, and a second of said feedback fluid passages supplying fluid against said diaphragm in opposition to said biasing spring to release excessive pressures that may occur within said object being inflated.

References Cited in the file of this patent
UNITED STATES PATENTS

| | | |
|---|---|---|
| 1,917,698 | Carson | July 11, 1933 |
| 2,501,801 | Wallin | Mar. 28, 1950 |
| 2,753,887 | Meincke | July 10, 1956 |
| 2,934,103 | Frise | Apr. 26, 1960 |
| 2,996,076 | Dion-Birs | Aug. 15, 1961 |